(12) United States Patent
Namekawa et al.

(10) Patent No.: US 12,210,191 B2
(45) Date of Patent: Jan. 28, 2025

(54) OPTICAL COUPLING DEVICE AND METHOD FOR MANUFACTURING OPTICAL COUPLING DEVICE

(71) Applicant: Orbray Co., Ltd., Tokyo (JP)

(72) Inventors: Tsuyoshi Namekawa, Tokyo (JP); Hiroyuki Fujiwara, Tokyo (JP); Masaru Sasaki, Tokyo (JP); Tsutomu Okamoto, Tokyo (JP)

(73) Assignee: Orbray Co., Ltd., Tokyo (JP)

( * ) Notice: Subject to any disclaimer, the term of this patent is extended or adjusted under 35 U.S.C. 154(b) by 204 days.

(21) Appl. No.: 17/519,075

(22) Filed: Nov. 4, 2021

(65) Prior Publication Data

US 2022/0057579 A1 Feb. 24, 2022

Related U.S. Application Data

(63) Continuation of application No. PCT/JP2020/019855, filed on May 20, 2020.

(30) Foreign Application Priority Data

May 21, 2019 (JP) .................................. 2019-095228

(51) Int. Cl.
G02B 6/26 (2006.01)
(52) U.S. Cl.
CPC .................................... G02B 6/262 (2013.01)
(58) Field of Classification Search
CPC ..................................................... G02B 6/262
See application file for complete search history.

(56) References Cited

U.S. PATENT DOCUMENTS 6,160,943 A 12/2000 Davis et al.
9,703,035 B2 7/2017 Imoto
(Continued)

FOREIGN PATENT DOCUMENTS

JP 2004-101657 A 4/2004
JP 2011-237782 A 11/2011
(Continued)

OTHER PUBLICATIONS

International Search Report (ISR) dated Aug. 18, 2020 filed in PCT/JP2020/019855.

*Primary Examiner* — Sung H Pak
(74) *Attorney, Agent, or Firm* — RANKIN, HILL & CLARK LLP

(57) ABSTRACT

An optical coupling device including multiple optical fibers each of which includes at least one core; and a self-forming optical waveguide, wherein the optical fibers are arranged facing each other, and the self-forming optical waveguide is provided between the optical fibers, an end portion of the self-forming optical waveguide is optically connected to the core of each optical fiber, the cores of the optical fibers arranged facing each other are optically connected to each other through the self-forming optical waveguide in a linear shape, optical axis directions of the optical fibers optically connected to each other through the self-forming optical waveguide are parallel with each other, and an end portion of each core is diagonally formed with an inclination angle according to a refractive index of each core and a refractive index of the self-forming optical waveguide.

4 Claims, 8 Drawing Sheets

(56) References Cited

U.S. PATENT DOCUMENTS

| | | | |
|---|---|---|---|
| 9,946,014 B2* | 4/2018 | Abedin | ............. G02B 6/02042 |
| 2005/0117845 A1 | 6/2005 | Hirose | |
| 2011/0249940 A1 | 10/2011 | Sasaoka et al. | |
| 2015/0055913 A1 | 2/2015 | Imoto | |
| 2016/0072585 A1 | 3/2016 | Halderman et al. | |

FOREIGN PATENT DOCUMENTS

| | | |
|---|---|---|
| JP | 5571855 B2 | 8/2014 |
| JP | 2015062044 A | 4/2015 |
| WO | 2013/051656 A1 | 4/2013 |

* cited by examiner

OPTICAL COUPLING DEVICE AND METHOD FOR MANUFACTURING OPTICAL COUPLING DEVICE

CROSS-REFERENCE TO RELATED APPLICATION

The present application is a continuation application of International Application No. PCT/JP2020/019855, filed on May 20, 2020, which claims priority to Japanese Patent Application No. 2019-095228, filed on May 21, 2019. The contents of these applications are incorporated herein by reference in their entirety.

BACKGROUND

1. Technical Field

One aspect of the present disclosure relates to an optical coupling device and the method for manufacturing the optical coupling device.

2. Related Art

As an optical fiber, an optical fiber having a single core in a clad as shown in FIG. 6(a) of Japanese Patent No. 5571855 has been used. Meanwhile, a multicore fiber shown in FIG. 6(b) of Japanese Patent No. 5571855 has been also proposed. The multicore fiber has multiple (four cores or more, about 19 cores) cores in the clad. The multicore fiber can transmit a mass of information.

In order to transmit a mass of information through the multicore fiber, the technique of separately optically connecting light emitted from each core of a multicore fiber having seven cores to each core of seven single-mode optical fibers as in FIG. 7 of Japanese Patent No. 5571855 has been used. However, it is difficult to optically connect the single-mode optical fiber to each core of the multicore fiber. A reason therefor is as follows. That is, the shape of the multicore fiber and the shape of the single-mode optical fiber are different from each other, and the core pitch of the single-mode optical fibers bundled according to core arrangement of the multicore fiber and the core pitch of the multicore fiber are different from each other. Thus, the technique of optically connecting these optical fibers is disclosed in Japanese Patent No. 5571855.

An optical coupling device described in Japanese Patent No. 5571855 (in this literature, described as a multicore fiber connector) is an optical coupling device for a multicore fiber, and optically connects, in one-to-one correspondence, the light emitted from the cores of the multicore fiber to the cores of the same number of single-mode optical fibers as that of the cores of the multicore fiber.

In this optical coupling device, the multicore fiber is inserted into and fixed in an insertion hole provided on one side of a quartz glass molded article. Further, the single-mode optical fibers are each inserted into and fixed in multiple insertion holes provided on the other side of the quartz glass molded article. In addition, a guide hole for guiding the single-mode optical fiber to the core of the multicore fiber is provided on an extension of each single-mode optical fiber insertion hole. Polymer is charged into these guide holes, and in this manner, optical waveguides are formed. With the optical waveguides, the cores of the multicore fiber are each optically connected to the cores of the single-mode optical fibers.

SUMMARY

An optical coupling device including multiple optical fibers each of which includes at least one core; and a self-forming optical waveguide, wherein the optical fibers are arranged facing each other, and the self-forming optical waveguide is provided between the optical fibers, an end portion of the self-forming optical waveguide is optically connected to the core of each optical fiber, the cores of the optical fibers arranged facing each other are optically connected to each other through the self-forming optical waveguide in a linear shape, optical axis directions of the optical fibers optically connected to each other through the self-forming optical waveguide are parallel with each other, and an end portion of each core is diagonally formed with an inclination angle according to a refractive index of each core and a refractive index of the self-forming optical waveguide.

DETAILED DESCRIPTION

Figure 1A:
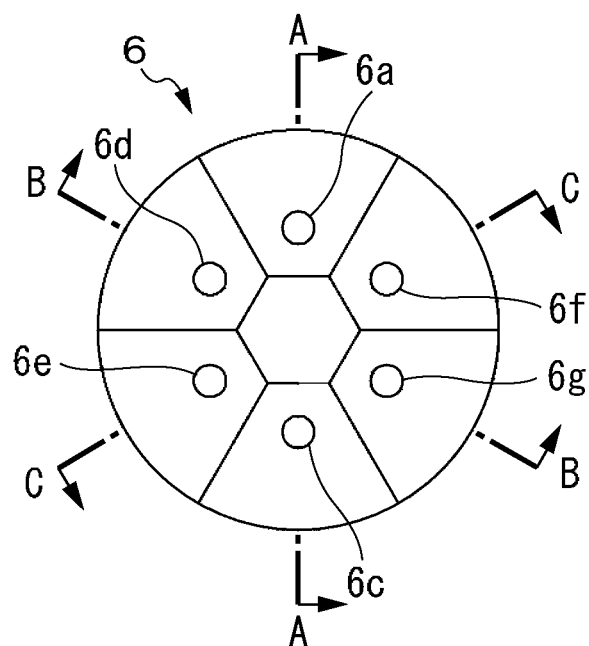
FIG. 1A is a plan view schematically showing an end portion of a multicore fiber used for an optical coupling device according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, in the optical coupling device described in Japanese Patent No. 5571855, an end surface of the multicore fiber is formed in a direction perpendicular to an optical axis direction. Further, the optical coupling device includes self-forming optical waveguides diagonally formed from the end surface of the multicore fiber. Thus, the angle of light incidence/emission of the multicore fiber and the angle of light incidence/emission of the diagonally-formed self-forming optical waveguide do not match with each other, and therefore, a connection loss is caused.

The single-mode optical fibers and the self-forming optical waveguides connected thereto are arranged coaxially, and therefore, it is assumed that an end surface of the single-mode optical fiber is at 0° and unnecessary reflection is caused at an interface between the single-mode optical fiber and the self-forming optical waveguide.

The single-mode optical fibers need to be arranged with the angle of the optical axis direction of each single-mode optical fiber being set with respect to the optical axis of the multicore fiber. For this reason, it is difficult to arrange the single-mode optical fibers.

One object of the present disclosure is to provide the following optical coupling device and the following method for manufacturing the optical coupling device. The optical coupling device can reduce a connection loss and a return loss between an optical fiber and a self-forming optical waveguide, and can achieve reduction in a manufacturing cost and improvement in a yield by easy arrangement of the optical fibers.

An optical coupling device (the present optical coupling device) according to one aspect of the present disclosure, including: multiple optical fibers each of which includes at least one core; and a self-forming optical waveguide, wherein the optical fibers are arranged facing each other, and the self-forming optical waveguide is provided between the optical fibers, an end portion of the self-forming optical waveguide is optically connected to the core of each optical fiber, the cores of the optical fibers arranged facing each other are optically connected to each other through the self-forming optical waveguide in a linear shape, optical axis directions of the optical fibers optically connected to each other through the self-forming optical waveguide are parallel with each other, and an end portion of each core is diagonally formed with an inclination angle according to a refractive index of each core and a refractive index of the self-forming optical waveguide.

A method for manufacturing an optical coupling device (the present manufacturing method) according to one aspect of the present disclosure, including: preparing multiple optical fibers each of which includes at least one core and whose end portions are diagonally formed with an inclination angle and photo-curing resin, the inclination angle being set based on a refractive index of each core of the optical fibers and a refractive index of the photo-curing resin; arranging the optical fibers facing each other such that optical axis directions thereof are parallel with each other; arranging the photo-curing resin between the optical fibers; causing light to enter the photo-curing resin through the optical fibers to cure the photo-curing resin, thereby forming a linear self-forming optical waveguide to optically connect the diagonally-formed end portions of the cores of the optical fibers to each other through the self-forming optical waveguide; and forming a clad by curing of the photo-curing resin.

According to the optical coupling device and the manufacturing method of the present disclosure, the connection loss and the return loss between the optical fiber and the self-forming optical waveguide can be reduced. Further, reduction in the cost for manufacturing the optical coupling device and improvement in the yield by easy arrangement of the optical fibers can be also achieved.

An optical coupling device according the first aspect of the present embodiment, including: multiple optical fibers each of which includes at least one core; and a self-forming optical waveguide, wherein the optical fibers are arranged facing each other, and the self-forming optical waveguide is provided between the optical fibers, an end portion of the self-forming optical waveguide is optically connected to the core of each optical fiber, the cores of the optical fibers arranged facing each other are optically connected to each other through the self-forming optical waveguide in a linear shape, optical axis directions of the optical fibers optically connected to each other through the self-forming optical waveguide are parallel with each other, and an end portion of each core is diagonally formed with an inclination angle according to a refractive index of each core and a refractive index of the self-forming optical waveguide.

A method for manufacturing an optical coupling device according to the second aspect of the present embodiment, comprising: preparing multiple optical fibers each of which includes at least one core and whose end portions are diagonally formed with an inclination angle and photo-curing resin, the inclination angle being set based on a refractive index of each core of the optical fibers and a refractive index of the photo-curing resin; arranging the optical fibers facing each other such that optical axis directions thereof are parallel with each other; arranging the photo-curing resin between the optical fibers; causing light to enter the photo-curing resin through the optical fibers to cure the photo-curing resin, thereby forming a linear self-forming optical waveguide to optically connect the diagonally-formed end portions, that are formed with an identical angle in parallel with each other, of the cores of the optical fibers to each other through the self-forming optical waveguide; and forming a clad by curing of the photo-curing resin.

The optical coupling device according to the third aspect of the present disclosure, wherein the optical fibers, in the optical coupling device according to the first aspect, include multiple first optical fibers and one multicore fiber, a total number of cores of the multiple first optical fibers and a total number of cores of the multicore fiber are both n which is a natural number not including zero, the multiple first optical fibers and the multicore fiber are arranged facing each other, and the self-forming optical waveguide is provided among the multiple first optical fibers and the multicore fiber, the end portions of the self-forming optical waveguide are optically connected to each core of the multiple first optical fibers and each core of the multicore fiber, arrangement of the cores of the multiple first optical fibers is identical to arrangement of the cores of the multicore fiber, the cores of the multiple first optical fibers and the cores of the multicore fiber are arrayed at an equal angle and an equal interval on a circumference of a circle about a center, the cores of the multiple first optical fibers and the multicore fiber arranged facing each other are optically connected to each other through the linear self-forming optical waveguide, and end portions of the cores optically connected to each other through the self-forming optical waveguide are diagonally formed with an identical angle in parallel with each other.

The method for manufacturing the optical coupling device according to the fourth aspect of the present embodiment, further including: in the method for manufacturing the optical coupling device according to the second aspect, preparing multiple first optical fibers and a multicore fiber as the optical fibers; confirming whether or not a total number of cores of the multiple first optical fibers and a total number of cores of the multicore fiber are both n which is a natural number not including zero and the cores of the multiple first optical fibers and the cores of the multicore fiber are arrayed at an equal angle and an equal interval on a circumference of a circle about a center; arranging the multiple first optical fibers and the multicore fiber facing each other; arranging the cores of the multiple first optical fibers in a manner identical to that of the cores of the multicore fiber; arranging the photo-curing resin among the multiple first optical fibers and the multicore fiber; causing light to enter the photo-curing resin through the multiple first optical fibers and the multicore fiber to cure the photo-curing resin, thereby forming the linear self-forming optical waveguide and optically connecting end portions, which are diagonally formed with an identical angle in parallel with each other, of the cores of the multiple first optical fibers and the cores of the multicore fiber to each other through the self-forming optical waveguide; and forming the clad by curing of the photo-curing resin.

According to the configuration and the manufacturing method, the connection loss and the return loss between the optical fiber and the self-forming optical waveguide can be reduced. Further, reduction in the cost for manufacturing the optical coupling device and improvement in the yield by easy arrangement of the optical fibers can be also achieved.

The optical coupling device according to the fifth aspect of the present disclosure, wherein, in the optical coupling device according to the third aspect, cores are further arrayed at the center as another core of the multiple first optical fibers and another core of the multicore fiber, end portions of the center cores are formed in a direction perpendicular to a light propagation direction of the center cores, and the center core of the multiple first optical fibers and the center core of the multicore fiber are optically connected to each other through the self-forming optical waveguide.

The method for manufacturing the optical coupling device according to the sixth aspect of the present disclosure, further comprising: in the method for manufacturing the optical coupling device according to the fourth aspect, confirming whether or not cores are further arrayed at the center as another core of the multiple first optical fibers and another core of the multicore fiber and end portions of the center cores are formed in a direction perpendicular to a light propagation direction of the center cores; and optically connecting an end portion of the center core of the multiple first optical fibers and an end portion of the center core of the multicore fiber to each other through the self-forming optical waveguide.

According to these configuration and manufacturing method, the center core of the multicore fiber and the core of the center first optical fiber can be, in addition to each of the above-described advantageous effects, used for center positioning upon manufacturing of the optical coupling device. Thus, manufacturing of the optical coupling device is more facilitated, and therefore, reduction in the manufacturing cost and improvement in the yield can be more easily achieved.

Figure 3:
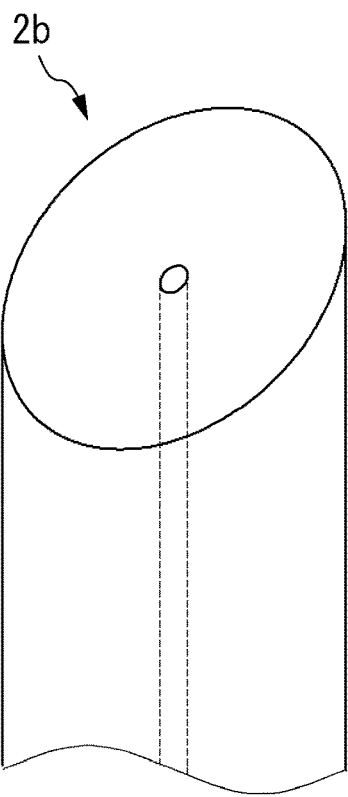
FIG. 3 is a perspective view schematically showing the end portion of the optical fiber shown in FIG. 2A.
Figure 4:
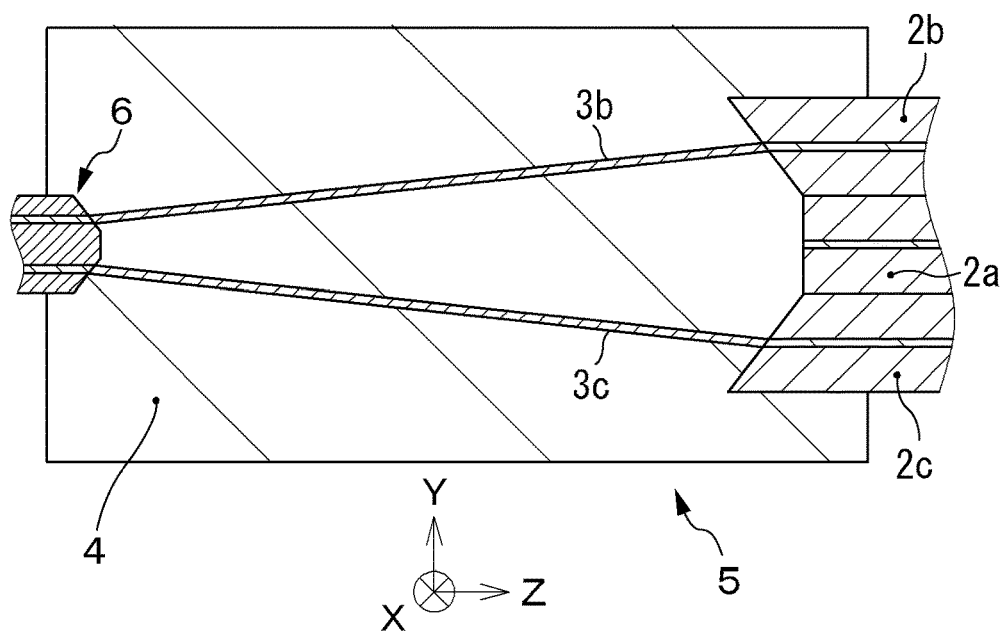
FIG. 4 is a sectional view schematically showing the optical coupling device according to the first embodiment of the present disclosure.
Figure 5A:
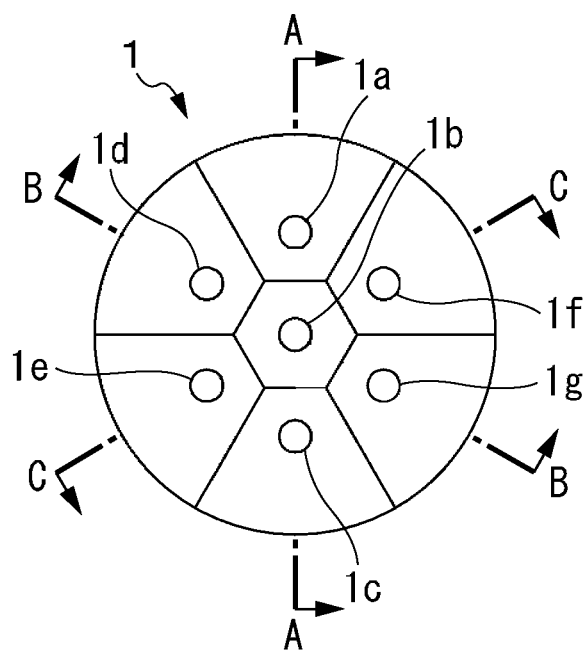
FIG. 5A is a plan view schematically showing an end portion of a multicore fiber used for an optical coupling device according to a second embodiment of the present disclosure.
Figure 5B:
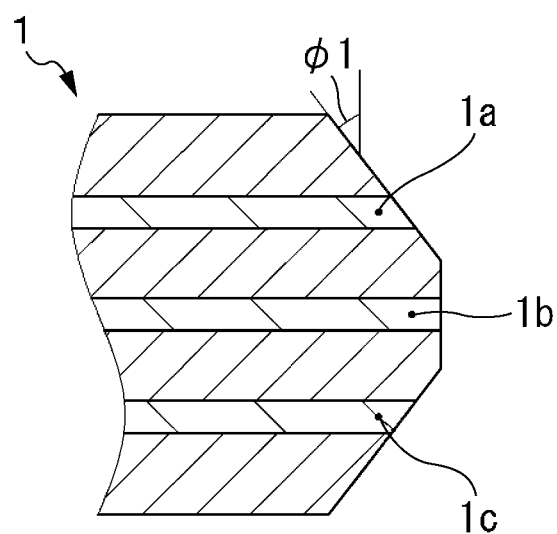
FIG. 5B is a sectional side view along an A-A line of FIG. 5A.
Figure 6:
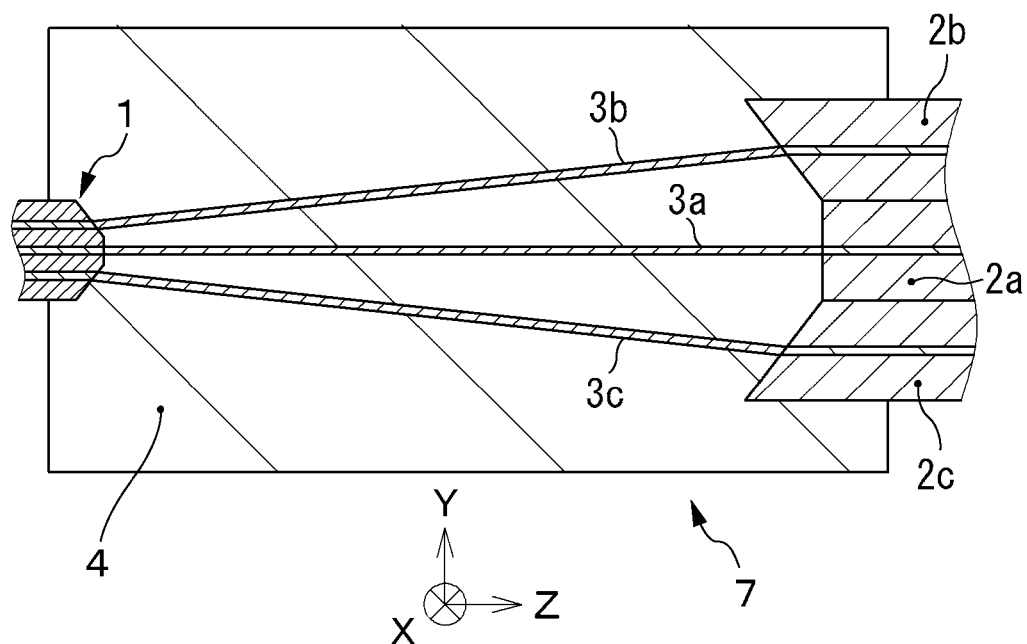
FIG. 6 is a sectional view schematically showing the optical coupling device according to the second embodiment of the present disclosure.

Hereinafter, a first embodiment according to the present disclosure will be described with reference to FIGS. 1A, 1B, 2A, 2B, 3, and 4. Note that a Z-axis of FIG. 4 is a direction parallel with a longitudinal direction of a multicore fiber 6 and a longitudinal direction of each optical fiber 2a to 2g. Moreover, X-axis and Y-axis directions are directions perpendicular to the Z-axis direction.

Referring to FIGS. 1A, 1B, 2A, 2B, and 4, an optical coupling device 5 according to the first embodiment is formed with multiple optical fibers (the optical fibers 2a to 2g and the multicore fiber 6), each of which includes at least one core, and multiple self-forming optical waveguides (only 3b and 3c are shown in FIG. 4). In the embodiment of FIGS. 1A, 1B, 2A, 2B, and 4, the optical fibers include seven optical fibers 2a to 2g and one multicore fiber 6. The optical fibers 2a to 2g serve as first optical fibers.

Each optical fiber 2a to 2g is of a type that a clad surrounds a core, is a single mode or a multimode, and is any of a step index fiber or a graded index fiber. Thus, the total number n (n: an natural number not including zero) of cores of the optical fibers 2a to 2g is seven. Further, each optical fiber 2a to 2g is made of glass or plastic. The outer diameter of the clad is 0.125 mm (125 μm) in the case of the single-mode optical fiber. Note that the mode field diameter of a single-mode fiber with a band of 1550 nm is 10.5 μm.

Figure 2A:
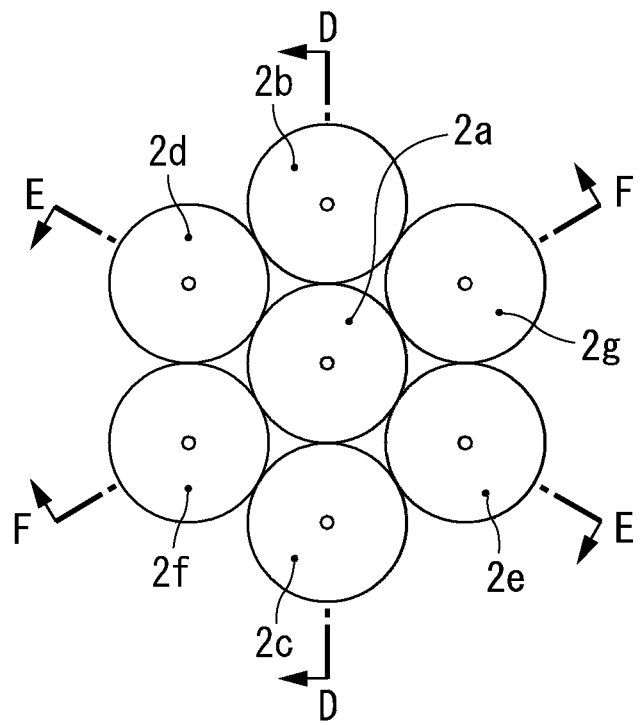
FIG. 2A is a plan view schematically showing an end portion of an optical fiber used for the optical coupling device according to the first embodiment of the present disclosure.
Figure 2B:
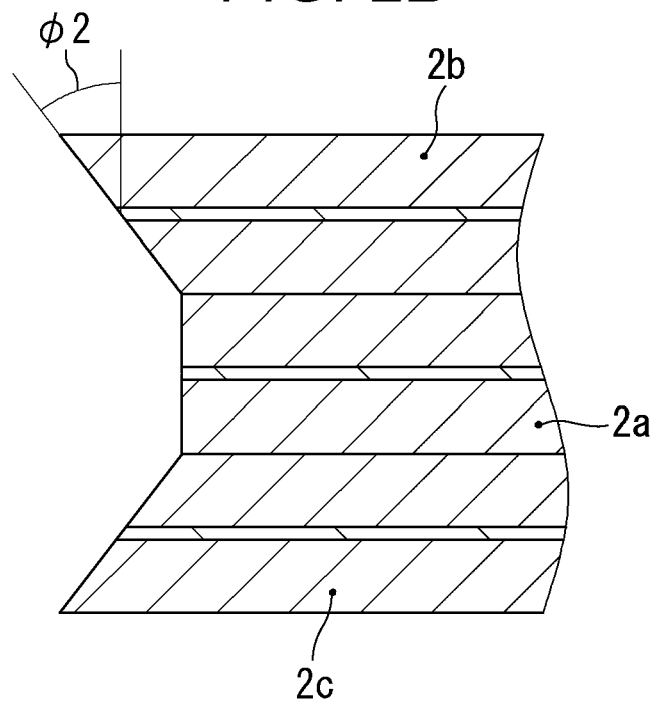
FIG. 2B is a sectional side view along a D-D line of FIG. 2A.

As shown in FIGS. 2A and 2B, the optical fiber 2a of the optical fibers 2a to 2g is arranged at the center, and the remaining six optical fibers 2b to 2g are arrayed in a circular pattern at equal angles)(60° and equal intervals about the optical fiber 2a. Thus, the cores of the optical fibers 2b to 2g are arrayed at equal angles)(60° and equal intervals on the circumference of a circle about the core of the center optical fiber 2a. At the center among the cores of the optical fibers 2b to 2g, the core of the optical fiber 2a is further arrayed as another core.

As shown in FIG. 2B, an end portion of the core of the center optical fiber 2a is formed in a direction perpendicular to a light propagation direction (the horizontal direction of FIG. 2B) of such a core (the core of the optical fiber 2a). As shown in FIGS. 2B and 3, an end portion of each core of the optical fibers 2b to 2g is diagonally formed with an inclination angle φ2. The inclination angle φ2 can be set to an optional angle according to the refractive index of each core of the optical fibers 2b to 2g and the refractive index of the self-forming optical waveguide. The inclination angle φ2 can be set within a range of 30° to 60°, for example. Note that in FIG. 3, only the structure of an end portion of the optical fiber 2b is shown. Other optical fibers 2c to 2g also have similar end portion structures.

Further, as shown in FIG. 2B, each optical fiber 2b to 2g is arrayed such that among the optical fibers 2b to 2g arrayed about the core of the center optical fiber 2a, the core end portions of the optical fibers arranged facing each other with an angle of 180° are symmetry with respect to a line. Thus, not only a sectional side view of FIG. 2B along a D-D line of FIG. 2A but also sectional side views along an E-E line and an F-F line also show sectional side structures similar to that of FIG. 2B.

The optical fibers 2a to 2g are arrayed such that outer peripheral surfaces of the dads of the optical fibers 2a to 2g contact each other, i.e., are arranged not to be shifted from each other. Note that bundle fibers may be used as the optical fibers 2a to 2g.

Figure 1B:
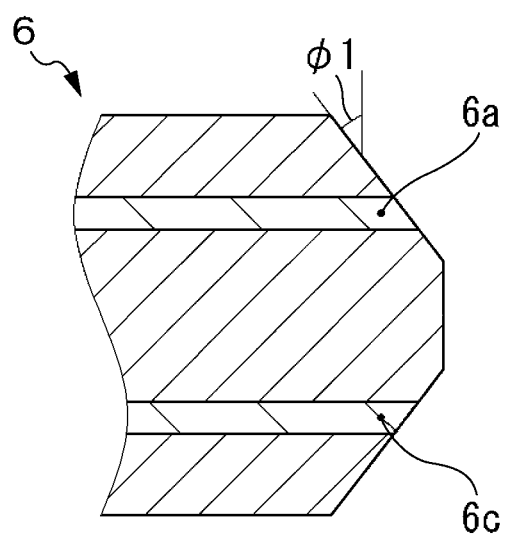
FIG. 1B is a sectional side view along an A-A line of FIG. 1A.

In the multicore fiber 6, a core diameter is about 9 μm, a clad diameter is 125 μm, and the number of cores is a plural number (n; six including 6a, 6c to 6g in FIGS. 1A and 1B). Further, as one example, a cutoff wavelength is 1190 nm to 1500 nm, and a mode field diameter is 4.8 µm to 5.6 µm (a propagating light wavelength of 1310 nm) or 5.7 µm to 8.5 µm (a propagating light wavelength of 1550 nm). Moreover, as shown in FIG. 1A, cores are arrayed at equal angles (60° in FIG. 1A) and equal intervals on the circumference of a circle about the center of the multicore fiber 6. Each core gap is 35 µm to 50 µm.

As shown in FIG. 1B, an end portion of each core 6a, 6c to 6g is diagonally formed with an inclination angle φ1. Further, as shown in FIGS. 1A and 1B, among the cores 6a, 6c to 6g arrayed about the center of the multicore fiber 6, the core end portions arranged facing each other with 180° are symmetry with respect to a line. Thus, not only a sectional side view of FIG. 1B along an A-A line of FIG. 1A but also sectional side views along a B-B line and a C-C line also show sectional side structures similar to that of FIG. 1B. The inclination angle φ1 is set to the same angle as the inclination angle φ2, and for example, can be set within a range of 30° to 60°.

Note that a center portion of the multicore fiber 6 is not diagonally formed with the inclination angle φ1, and is formed in a direction perpendicular to an axial direction (the horizontal direction of FIG. 1B) of the multicore fiber 6.

Further, the self-forming optical waveguides (hereinafter referred to as optical waveguides) are provided among the optical fibers 2a to 2g and the multicore fiber 6. The same number (six) of optical waveguides as the number of cores of the multicore fiber 6 is formed. Note that FIG. 4 shows only two (3b and 3c) of the six optical waveguides. The optical waveguides are formed in a not-shown container. A clad 4 is formed around the optical waveguides. The clad 4 is also housed in the container. The clad 4 can be, for example, formed in a circular columnar shape, a rectangular columnar shape, or other three-dimensional shapes according to a container inner surface shape.

A dimension in the Z-axis direction between the end portion of the center portion of the multicore fiber 6 and the end portion of the optical fiber 2a can be set according to the inclination angles φ1, φ2, each optical axis direction with respect to the end portions diagonally formed with the inclination angles φ1, φ2, the refractive index of each core of the multicore fiber 6, the refractive index of each core of the optical fibers 2b to 2g, the refractive index of the optical waveguide, and the refractive index of photo-curing resin forming the optical waveguide. Of the inclination angles φ1, φ2, the refractive index of the photo-curing resin to be the self-forming optical waveguide, the positions of the multicore fiber 6 and the optical fibers 2b to 2g in the X-axis or Y-axis direction, and a distance between the multicore fiber 6 and each optical fiber 2b to 2g in the Z-axis direction, three parameters are determined, so that an optimal solution can be obtained.

The container is formed in a hollow three-dimensional shape forming the outer shape of the clad 4. Moreover, the material of the container may be a hard material such as metal, hard synthetic resin, ceramic, or glass. As necessary, the container is provided with, e.g., a window or an opening allowing penetration of ultraviolet light (UV).

An end portion of the multicore fiber 6 is arranged on one end side of the container. Moreover, on the other end side of the container, the end portions of the optical fibers 2a to 2g are arranged. Further, the container is provided with a not-shown opening for charging the photo-curing resin forming each optical waveguide and the clad 4.

Each optical fiber 2a to 2g and the multicore fiber 6 are arranged facing each other. Arrangement of each core of the optical fibers 2b to 2g in the Z-axis direction is set to the same arrangement as that of each core 6a, 6c to 6g of the multicore fiber 6. Further, each optical axis direction of the optical fibers 2a to 2g and the multicore fiber 6 is arranged parallel with the Z-axis direction. The six optical waveguides are linearly provided between the core of each optical fiber 2b to 2g and the multicore fiber 6. Thus, both end portions of the optical waveguide in the Z-axis direction are each optically connected to a corresponding one of the cores of the optical fibers 2b to 2g and a corresponding one of the cores 6a, 6c to 6g of the multicore fiber 6. Specifically, the core 6a and the core of the optical fiber 2b are optically connected to each other through the optical waveguide, the core 6c and the core of the optical fiber 2c are optically connected to each other through the optical waveguide, the core 6f and the core of the optical fiber 2d are optically connected to each other through the optical waveguide, the core 6d and the core of the optical fiber 2g are optically connected to each other through the optical waveguide, the core 6g and the core of the optical fiber 2f are optically connected to each other through the optical waveguide, and the core 6e and the core of the optical fiber 2e are optically connected to each other through the optical waveguide. Note that the optical fiber 2a is not optically connected to the optical waveguide.

Based on each parameter described above, the dimension in the Z-axis direction between the end portion of the center portion of the multicore fiber 6 and the end portion of the optical fiber 2a is set according to the Snell's law (the law of refraction) so that the linear optical waveguides can be formed. The inclination angle φ1 and the inclination angle φ2 are set to the same angle, and accordingly, the end portions of the cores 6a, 6c to 6g of the multicore fiber 6 and the end portions of the cores of the optical fibers 2b to 2g are, as shown in FIG. 4, diagonally formed with the same angle in parallel with each other, the end portions of the cores 6a, 6c to 6g of the multicore fiber 6 and the end portions of the cores of the optical fibers 2b to 2g being optically connected to each other through the optical waveguides.

Note that in the present embodiment, even if there is a height difference in the X-axis direction between each optical fiber 2b to 2g and the multicore fiber 6, in a case where the optical waveguides are formed among the cores, such a state is taken as each optical fiber 2b to 2g and the multicore fiber 6 being arranged facing each other.

Next, the method for manufacturing the optical coupling device 5 will be described. First, multiple optical fibers each of which includes at least one core and whose end portions are diagonally formed and photo-curing resin are prepared. As the optical fibers, optical fibers 2a to 2g and a multicore fiber 6 are prepared. Further, the optical fibers 2a to 2g and the multicore fiber 6 are arranged facing each other, and arrangement of the cores of the optical fibers 2b to 2g and arrangement of the cores of the multicore fiber 6 are the same as each other. Note that the fiber end portions can be diagonally formed with an inclination angle φ1 and an inclination angle φ2 by, e.g., $CO_2$ laser processing.

The photo-curing resin is prepared in such a manner that the photo-curing resin is charged into a not-shown container through an opening thereof. The photo-curing resin is charged into the container, and accordingly, is arranged among the optical fibers 2a to 2g and the multicore fiber 6.

The photo-curing resin is of a clad selective polymerization type. The material of the photo-curing resin is a solution containing a liquid mixture of two or more types of monomer and a photopolymerization initiator added to such a liquid mixture. The photo-curing resin is polymerized and cured into polymer by incident light with such a wavelength band that the photopolymerization initiator has a sensitivity.

It is confirmed whether or not the total number of cores of the optical fibers 2b to 2g other than the optical fiber 2a not optically connected to an optical waveguide is n (n: a natural number not including zero, and 6) and the total number of cores of the multicore fiber 6 is n (n: a natural number not including zero, and 6). Further, it is confirmed whether or not the cores of the optical fibers 2b to 2g and the cores 6a, 6c to 6g of the multicore fiber 6 are, as described above, arrayed at equal angles and equal intervals on the circumferences of circles about the centers.

Note that after the photo-curing resin has been charged into the container, the optical fibers 2a to 2g and the multicore fiber 6 may be arranged facing each other at both ends of the container.

Next, light enters the photo-curing resin through each optical fiber 2b to 2g and each core 6a, 6c to 6g of the multicore fiber 6 to polymerize and cure the photo-curing resin. Accordingly, six linear optical waveguides are formed. Each optical waveguide is formed based on the Snell's law. The wavelength λw of the light for polymerizing and curing the photo-curing resin can be set as necessary according to the photopolymerization initiator. The wavelength of such light is, as one example, 365 nm to 1675 nm.

The inclination angle φ1 and the inclination angle φ2 are set to the same angle so that the end portions, which are diagonally formed with the same angle in parallel with each other, of the optical fibers 2b to 2g and the cores 6a, 6c to 6g of the multicore fiber 6 can be optically connected to each other through the optical waveguides as shown in FIG. 4.

Next, the clad 4 is formed. The clad 4 is of a clad selective polymerization type. In each optical waveguide, at least one type of monomer is in polymerization reaction with the wavelength λw. As a result, in the cured core region, a non-polymerization-reacted monomer component is, at the same level of concentration as that in the liquid mixture, dispersed as unreacted monomer. At the same time, only one type of monomer is consumed and polymerized in the core region. Thus, at a boundary surface between the core and the clad, a monomer concentration gradient is caused, and interdiffusion progresses. Accordingly, the function of the clad can be obtained. Finally, the entirety of the photo-curing resin is irradiated with ultraviolet light (UV irradiation), and accordingly, the cores and the entirety of the clad 4 are cured and formed and the optical waveguides are obtained.

When the six optical waveguides are formed, the six optical waveguides may be sequentially formed one by one with a time lag. Alternatively, the six optical waveguides may be simultaneously formed with no time lag in such a manner that light simultaneously enters the photo-curing resin through the optical fibers 2b to 2g and the cores 6a, 6c to 6g of the multicore fiber 6. Note that in a case where the light enters simultaneously, a time lag of 2 to 3 seconds is within an acceptable range at manufacturing steps.

As described above, according to the optical coupling device 5 and the method for manufacturing the optical coupling device 5 in the first embodiment, the core end surface of the multicore fiber 6 is diagonally formed with the inclination angle φ1 with respect to the optical axis direction (the Z-axis direction of FIG. 4). Moreover, the optical coupling device 5 includes the self-forming optical waveguides diagonally formed with respect to the optical axis direction of the multicore fiber 6. Thus, the angle of light emission from the core end surface of the multicore fiber 6 can match the diagonally-formed self-forming optical waveguide. With this configuration, a connection loss among the multicore fiber 6 and the self-forming optical waveguides can be reduced.

The end surfaces of the optical fibers 2b to 2g are diagonally formed with the inclination angle φ2 according to the refractive index of each core and the refractive index of the self-forming optical waveguide. Thus, a return loss at the end surfaces of the optical fibers 2b to 2g can be reduced.

The end surface of the multicore fiber 6 and each end surface of the optical fibers 2b to 2g are diagonally formed with these inclination angles φ1, φ2, so that the optical axis direction of each optical fiber (6 and 2b to 2g) can be, as shown in FIG. 4, arranged parallel with the Z-axis direction. Thus, there is no need to arrange each optical fiber (6 and 2b to 2g) with the angle of each optical fiber in the optical axis direction being set. Consequently, arrangement of the optical fibers (6 and 2b to 2g) is facilitated, and therefore, reduction in a cost for manufacturing the optical coupling device 5 and improvement in the yield of the optical coupling device 5 can be achieved.

In the optical coupling device 5, the cores of the optical fibers (each optical fiber 2b to 2g and the multicore fiber 6) arranged facing each other are optically connected to each other through the linear optical waveguides. Further, arrangement of the cores of the optical fibers 2b to 2g and arrangement of the cores 6a, 6c to 6g of the multicore fiber 6 are the same as each other. Thus, when the optical waveguides are formed, crossing of adjacent ones of the optical waveguides can be reduced. Consequently, erroneous connection to an adjacent core is reduced. As a result, reduction in the connection loss of the optical coupling device 5 and improvement of the yield of the optical coupling device 5 can be achieved.

Further, the end portions of the cores of the optical fibers (6 and 2b to 2g) optically connected to each other through the optical waveguides are diagonally formed with the same angle, such as φ1=φ2, in parallel with each other. Thus, processing of each optical fiber tip end is facilitated. As a result, the cost for manufacturing the optical coupling device 5 can be reduced.

Figure 7A:
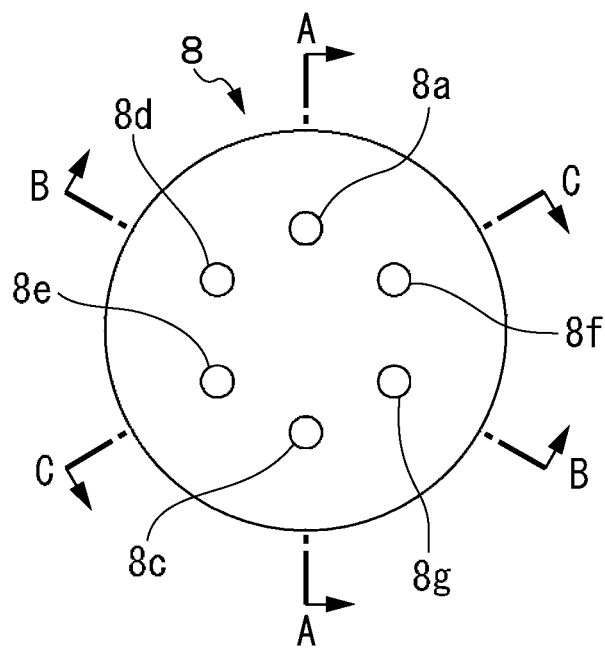
FIG. 7A is a plan view schematically showing an end portion of a multicore fiber used for an optical coupling device according to a modification of the first embodiment of the present disclosure.
Figure 7B:
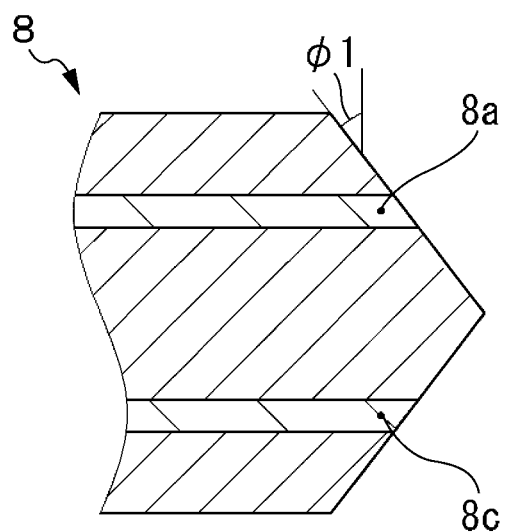
FIG. 7B is a sectional side view along an A-A line of FIG. 7A.

Note that as a modification of the first embodiment, a multicore fiber 8 whose end surface is formed in a conical shape with the inclination angle φ1 as shown in FIGS. 7A and 7B may be used instead of the multicore fiber 6. The multicore fiber 8 also includes six cores 8a, 8c to 8g. Not only a sectional side view of FIG. 7B along an A-A line of FIG. 7A but also sectional side views along a B-B line and a C-C line also show sectional side structures similar to that of FIG. 7B.

Next, an optical coupling device 7 and the method for manufacturing the optical coupling device 7 according to a second embodiment of the present disclosure will be described with reference to FIGS. 2A, 2B, 5A, 5B, and 6. Note that the same numerals are used to represent the same elements as those of the optical coupling device 5 of the first embodiment and overlapping description thereof will be simplified or omitted.

Differences of the optical coupling device 7 from the optical coupling device 5 are that cores 1b to 1g are, as each core of a multicore fiber 1, arrayed at equal angles (60° in FIG. 5A) and equal intervals on the circumference of a circle about the center of the multicore fiber 1 and another core 1a is further arrayed at the center. Thus, in addition to optical connection among the cores 1b to 1g and each core of optical fibers 2b to 2g through optical waveguides, a core of a center optical fiber 2*a* and the center core 1*b* at the center are optically connected to each other through a linear optical waveguide 3*a*.

When the optical coupling device 7 is manufactured, it is confirmed whether or not an end portion of the core 1*b* is formed in a direction perpendicular to a light propagation direction of the core 1*b*. Next, it is confirmed whether or not the total number of cores of the optical fibers 2*a* to 2*g* and the total number of cores 1*a* to 1*g* of the multicore fiber 1 are the same as each other (in FIGS. 2A, 2B, 5A, and 5B, the total number is an identical number of 7).

According to the optical coupling device 7 and the method for manufacturing the optical coupling device 7 according to the second embodiment, the center core 1*a* at the multicore fiber 1 and the core of the optical fiber 2*a* can be used for center positioning upon manufacturing of the optical coupling device 7. Thus, in addition to the advantageous effects of the optical coupling device 5 of the first embodiment, manufacturing of the optical coupling device 7 is more facilitated. Consequently, reduction in a manufacturing cost and improvement in a yield can be more easily achieved.

Next, an optical coupling device according to a third embodiment of the present disclosure will be described with reference to FIGS. 8A and 8B. Note that the same numerals are used to represent the same elements as those of each of the above-described embodiments and overlapping description thereof will be simplified or omitted.

A difference of the optical coupling device according to the third embodiment from the optical coupling device 5 is that a fiber including four cores 9*a* to 9*d* is used instead of the multicore fibers 1, 6, 8. Further, each end surface of the cores 9*a* to 9*d* is formed in a planar shape with an inclination angle φ1. Thus, an end surface of a multicore fiber 9 is formed in a quadrangular pyramid shape.

Thus, multiple optical fibers (first optical fibers) optically connected to the multicore fiber 9 through self-forming optical waveguides form a fiber group in which the optical fibers shown in FIG. 3 are arranged in the same manner as that of the cores 9*a* to 9*d*, i.e., arranged in two rows and two cores. As this fiber group, a bundle fiber with two-row two-core arrangement may be used.

Figure 8A:
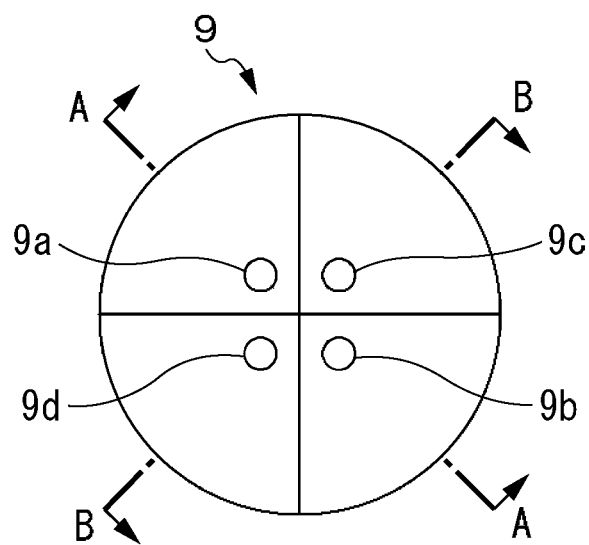
FIG. 8A is a plan view schematically showing an end portion of a multicore fiber used for an optical coupling device according to a third embodiment of the present disclosure.
Figure 8B:
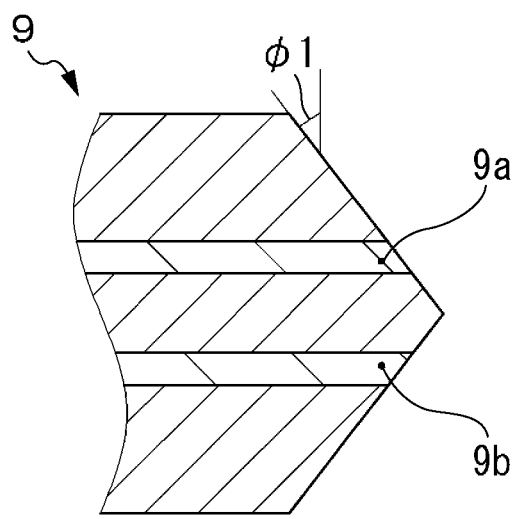
FIG. 8B is a sectional side view along an A-A line of FIG. 8A.

Note that not only a sectional side view of FIG. 8B along an A-A line of FIG. 8A but also a sectional side view along a B-B line also show sectional side structures similar to that of FIG. 8B.

Figure 9A:
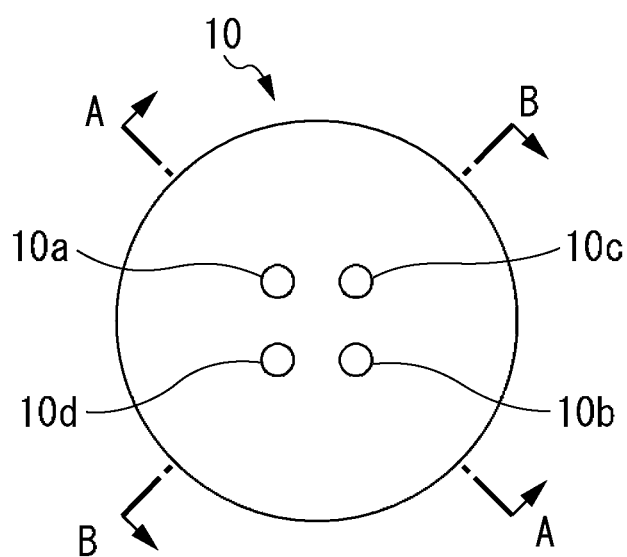
FIG. 9A is a plan view schematically showing an end portion of a multicore fiber used for an optical coupling device according to a modification of the third embodiment of the present disclosure.
Figure 9B:
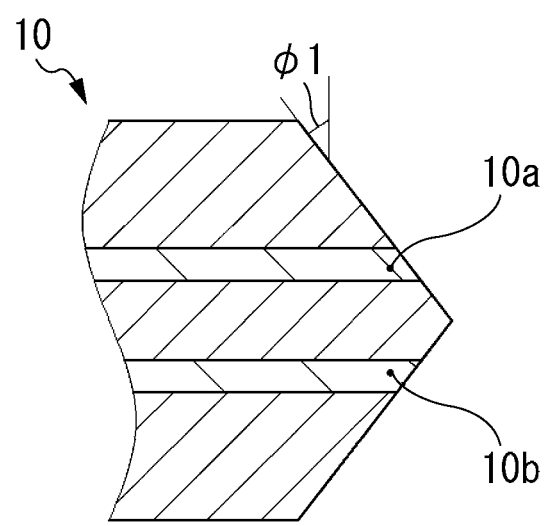
FIG. 9B is a sectional side view along an A-A line of FIG. 9A.

Note that as a modification of the third embodiment, a multicore fiber 10 whose end surface is formed in a conical shape with the inclination angle φ1 as shown in FIGS. 9A and 9B may be used instead of the multicore fiber 9. The multicore fiber 10 also includes four cores 10*a* to 10*d*. Not only a sectional side view of FIG. 9B along an A-A line of FIG. 9A but also a sectional side view along a B-B line also show sectional side structures similar to that of FIG. 9B.

Note that the technique of the present disclosure can be changed to various forms based on the technical idea of the technique of the present disclosure. For example, the following optical coupling device may be formed. The optical coupling device includes multiple single-core optical fibers, each of which includes one core, instead of the optical fibers 2*a* to 2*g* and the multicore fiber (1, 6). These single-core optical fibers are arranged facing each other. Further, optical axis directions of the optical fibers are arranged parallel with each other. Moreover, each end portion of the optical fibers is diagonally formed with an angle according to the refractive index of each core and the refractive index of a self-forming optical waveguide, and these end portions are connected to each other through linear optical waveguides.

The optical fibers arranged facing each other may be optical fibers made of different materials.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. An optical coupling device comprising:
multiple first optical fibers each of which includes a core;
a multicore fiber including a plurality of cores; and
a plurality of self-forming optical waveguides,
wherein the multiple first optical fibers are arranged facing the multicore fiber, and the plurality of self-forming optical waveguides are provided between the multiple first optical fibers and the multicore fiber,
one end portion of each of the plurality of self-forming optical waveguides is optically connected to the core of each of the multiple first optical fibers,
another end portion of each of the plurality of self-forming optical waveguides is optically connected to each of the plurality of cores of the multicore fiber,
each of the cores of the multiple first optical fibers is optically connected to each of the cores of the multicore fiber through each of the plurality of self-forming optical waveguides in a linear shape,
optical axis directions of the multiple first optical fibers are parallel with optical axis directions of the multicore fiber optically connecting to each of the multiple first optical fibers through each of the plurality of self-forming optical waveguides,
end portions of the cores of the multiple first optical fibers and the multicore fiber are diagonally formed with an inclination angle according to a refractive index of each core and a refractive index of the self-forming optical waveguides,
a total number of the cores of the multiple first optical fibers and a total number of the cores of the multicore fiber are both n which is a natural number not including zero,
arrangement of the cores of the multiple first optical fibers is identical to arrangement of the cores of the multicore fiber,
the cores of the multiple first optical fibers and the cores of the multicore fiber are arrayed at an equal angle and an equal interval on a circumference of a circle about a center, and
the end portions of the cores optically connected to each other through each of the self-forming optical waveguides are diagonally formed with an identical angle in parallel with each other.
2. The optical coupling device according to claim 1, further comprising a second optical fiber which includes a core, wherein
the cores of the multiple first optical fibers are arrayed in a circular pattern about the core of the second optical fiber, the multicore fiber further includes a center core, the plurality of cores of the multicore fiber are arrayed in a circular pattern about the center core of the multicore fiber, an end portion of the core of the second optical fiber is formed in a direction perpendicular to a light propagation direction of the core of the second optical fiber, an end portion of the center core of the multicore fiber is formed in a direction perpendicular to a light propagation direction of the center core of the multicore fiber, and the core of the second optical fiber and the center core of the multicore fiber are optically connected to each other through a second self-forming optical waveguide.

3. A method for manufacturing an optical coupling device, comprising:

preparing multiple first optical fibers each of which includes a core, a multicore fiber including a plurality of cores, and photo-curing resin, wherein end portions of the cores of the multiple first optical fibers and the multicore fiber are diagonally formed with an inclination angle, the inclination angle being set based on a refractive index of each core of the optical fibers and a refractive index of the photo-curing resin;

arranging the multiple first optical fibers facing the multicore fiber such that optical axis directions of the multiple first optical fibers are parallel with optical axis directions of the multicore fiber;

arranging the photo-curing resin between the multiple first optical fibers and the multicore fiber;

causing light to enter the photo-curing resin through the multiple first optical fibers and the multicore fiber to cure the photo-curing resin, thereby forming a linear self-forming optical waveguide to optically connect the diagonally-formed end portions of the cores of the multiple first optical fibers to the diagonally-formed end portions of the cores of the multicore fiber through the self-forming optical waveguide; and forming a clad by curing of the photo-curing resin, wherein the method further comprises:

confirming whether or not a total number of the cores of the multiple first optical fibers and a total number of the cores of the multicore fiber are both n which is a natural number not including zero and the cores of the multiple first optical fibers and the cores of the multicore fiber are arrayed at an equal angle and an equal interval on a circumference of a circle about a center; and arranging the cores of the multiple first optical fibers in a manner identical to arrangement of the cores of the multicore fiber, wherein the end portions of the cores optically connected to each other through each of the self-forming optical waveguides are diagonally formed with an identical angle in parallel with each other.

4. The method for manufacturing the optical coupling device according to claim 3, further comprising:

preparing a second optical fiber which includes a core, wherein the cores of the multiple first optical fibers are arrayed in a circular pattern about the core of the second optical fiber, and an end portion of the core of the second optical fiber is formed in a direction perpendicular to a light propagation direction of the core of the second optical fiber;

confirming whether or not a center core is further arrayed in the multicore fiber such that the plurality of cores of the multicore fiber are arrayed in a circular pattern about the center core of the multicore fiber, and an end portion of the center core of the multicore fiber is formed in a direction perpendicular to a light propagation direction of the center core of the multicore fiber; and optically connecting the end portion of the core of the second optical fiber and the end portion of the center core of the multicore fiber through a second self-forming optical waveguide.

* * * * *